US006104993A

United States Patent [19]

Ashley

[11] Patent Number: 6,104,993

[45] **Date of Patent: *Aug. 15, 2000**

[54] APPARATUS AND METHOD FOR RATE DETERMINATION IN A COMMUNICATION SYSTEM

[75] Inventor: James P. Ashley, Naperville, Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/806,949

[22] Filed: Feb. 26, 1997

[51] Int. Cl.[7] .......................... G10L 19/00; H04B 15/00

[52] U.S. Cl. .......................... 704/227; 704/226; 704/233; 381/94.1

[58] Field of Search .................................... 704/221, 214, 704/212, 223, 226, 228, 233, 237, 227; 381/94.1

[56] References Cited

U.S. PATENT DOCUMENTS

| | | | |
|---|---|---|---|
| 5,341,456 | 8/1994 | DeJaco | 704/214 |
| 5,414,796 | 5/1995 | Jacobs et al. | 704/221 |
| 5,544,250 | 8/1996 | Urbanski | 704/228 |
| 5,649,055 | 7/1997 | Gupta et al. | 704/215 |
| 5,659,622 | 8/1997 | Ashley | 704/227 |
| 5,920,834 | 7/1999 | Sih et al. | 704/233 |
| 5,937,377 | 8/1999 | Hardiman et al. | 704/225 |

OTHER PUBLICATIONS

TR45, "Enhanced Variable Rate Codec, Speech Service Option 3 for Wideband Spread Spectrum Digital Systems", IS–127, Sep. 9, 1996.

*Primary Examiner*—David R. Hudspeth
*Assistant Examiner*—Susan Wieland
*Attorney, Agent, or Firm*—Richard A. Sonnentag; R. Louis Breeden

[57] ABSTRACT

To accurately determine rate and voice activity in moderate-to-low signal-to-noise ratios (SNRs) to maximize voice quality, system capacity and/or battery life, parameters from a noise suppression system are used as inputs to the rate determination function. Using this method, more of the speech is extracted from the background noise and a lower number of false onsets during fluctuating noise conditions compared with conventional systems are detected. The method is beneficial for voice activity detection (VAD) as well as rate determination (RDA) and unlike other RDA/VAD implementations, is independent of the type of speech coder employed (IS-127, CDG-27, IS-96 and GSM).

28 Claims, 7 Drawing Sheets

APPARATUS AND METHOD FOR RATE DETERMINATION IN A COMMUNICATION SYSTEM

FIELD OF THE INVENTION

The present invention relates generally to rate determination and, more particularly, to rate determination in communication systems.

BACKGROUND OF THE INVENTION

In variable rate vocoders systems, such as IS-96, IS-127 (EVRC), and CDG-27, there remains the problem of distinguishing between voice and background noise in moderate to low signal-to-noise ratio (SNR) environments. The problem is that if the Rate Determination Algorithm (RDA) is too sensitive, the average data rate will be too high since much of the background noise will be coded at Rate 1/2 or Rate 1. This will result in a loss of capacity in code division multiple access (CDMA) systems. Conversely, if the RDA is set too "lean", low level speech signals will remain buried in moderate levels of noise and coded at Rate 1/8. This will result in degraded speech quality due to lower intelligibility.

Although the RDA's in the EVRC and CDG-27 have been improved since IS-96, recent testing by the CDMA Development Group (CDG) has indicated that there is still a problem in car noise environments where the SNR is 10 dB or less. This level of SNR may seem extreme, but in hands-free mobile situations this should be considered a nominal level. Fixed-rate vocoders in time division multiple access (TDMA) mobile units can also be faced with similar problems when using discontinuous transmission (DTX) to prolong battery life. In this scenario, a Voice Activity Detector (VAD) determines whether or not the transmit power amplifier is activated, so the tradeoff becomes voice quality versus battery life.

Thus, a need exists for an improved apparatus and method for rate determination in communication systems.

DETAILED DESCRIPTION OF A PREFERRED EMBODIMENT

Figure 1:
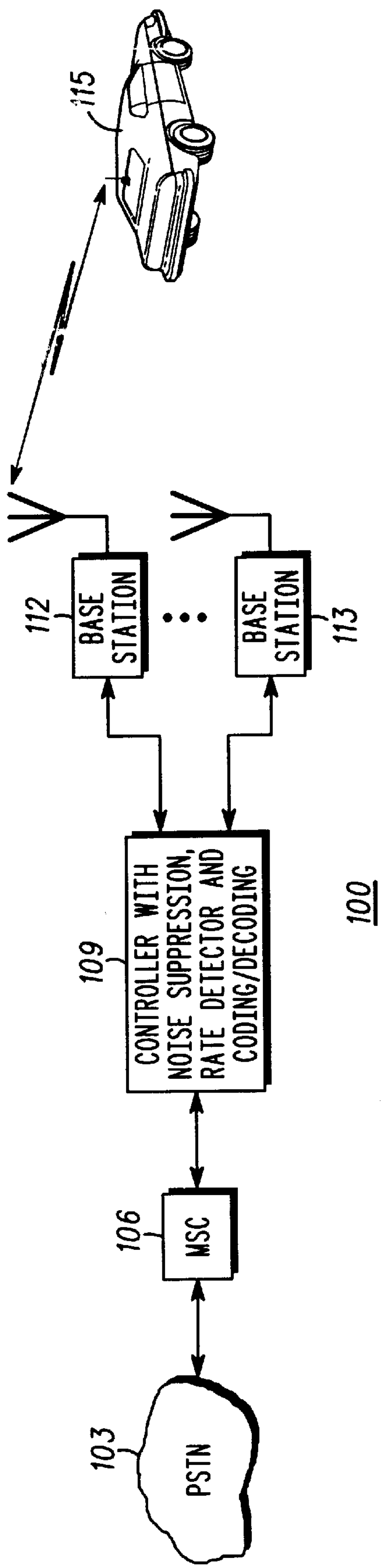
FIG. 1 generally depicts a communication system which beneficially implements improved rate determination in accordance with the invention.

To accurately determine rate and voice activity in moderate-to-low signal-to-noise ratios (SNRs) to maximize voice quality, system capacity and/or battery life, parameters from a noise suppression system are used as inputs to the rate determination function. Using this method, more of the speech is extracted from the background noise and a lower number of false onsets during fluctuating noise conditions compared with conventional systems are detected. The method is beneficial for voice activity detection (VAD) as well as rate determination (RDA) and unlike other RDA/VAD implementations, is independent of the type of speech coder employed (IS-127, CDG-27, IS-96 and GSM).

Stated generally, an apparatus for determining transmission rate in a communication system comprises a noise suppression system for suppressing background noise in a signal input to the noise suppression system, the noise suppression system generating parameters related to the suppression of the background noise and a rate determination means, having as input the parameters generated by the noise suppression system, for generating transmission rate information for use by a speech coder. In the preferred embodiment, the noise suppression system is substantially a noise suppression system as defined in IS-127 and the parameters generated by the noise suppression system include a control signal which allows the noise suppression system to recover when a sudden increase in background noise causes the noise suppression system to erroneously misclassify background noise.

Stated more specifically, the apparatus for determining transmission rate in a communication system comprises means for estimating the channel energy in a current frame of information and means, having as input the estimated channel energy, for determining the difference between the estimated channel energy for the current frame of information and the energy of a plurality of past frames of information to produce a total channel energy estimate for the current frame. A means for determining a voice metric then determines the voice metric based on estimates of signal-to-noise ratio of the current frame of information and a means for producing a total estimated noise energy based on the estimated channel energy. Based on the total channel energy estimate for the current frame, the voice metric and the total estimated noise energy, a means for determining the rate of transmission determines the transmission rate of the frame of information.

In this embodiment, the apparatus further comprises a means, having as input the total channel energy estimate for the current frame of information, a peak-to-average ratio of the current frame of information, a spectral deviation between the current frame and past frames and the voice metric, for producing a control signal which prevents a noise estimate from being updated when certain types of signals are present. More specifically, the control signal prevents a noise estimate from being updated when tonal signals are present which allows sinewaves to be transmitted at full rate for purposes of testing the communication system.

The steps performed by the apparatus in accordance with the invention include determining a first voice metric threshold from a peak signal-to-noise ratio of a current frame of information and comparing a voice metric to the first voice metric threshold. When the voice metric is less than the first voice metric threshold, the frame of information is transmitted at a first rate. When the voice metric is greater than the first voice metric threshold, the voice metric is compared to a second voice metric threshold. When the voice metric is less than the second voice metric threshold, the frame of information is transmitted at a second rate, otherwise the frame of information is transmitted at a third rate.

The communication system implementing such steps is a code-division multiple access (CDMA) communication system as defined in IS-95. As defined in IS-95, the first rate comprises 1/8 rate, the second rate comprises 1/2 rate and the third rate comprises full rate of the CDMA communication system. In this embodiment, the second voice metric threshold is a scaled version of the first voice metric threshold and a hangover is implemented after transmission at either the second or third rate.

The peak signal-to-noise ratio of a current frame of information in this embodiment comprises a quantized peak signal-to-noise ratio of a current frame of information. As such, the step of determining a voice metric threshold from the quantized peak signal-to-noise ratio of a current frame of information further comprises the steps of calculating a total signal-to-noise ratio for the current frame of information and estimating a peak signal-to-noise ratio based on the calculated total signal-to-noise ratio for the current frame of information. The peak signal-to-noise ratio of the current frame of information is then quantized to determine the voice metric threshold.

The communication system can likewise be a time-division multiple access (TDMA) communication system such as the GSM TDMA communication system. The method in this case determines that the first rate comprises a silence descriptor (SID) frame and the second and third rates comprise normal rate frames. As stated above, a SID frame includes the normal amount of information but is transmitted less often than a normal frame of information.

FIG. 1 generally depicts a communication system which beneficially implements improved rate determination in accordance with the invention. In the embodiment depicted in FIG. 1, the communication system is a code-division multiple access (CDMA) radiotelephone system, but as one of ordinary skill in the art will appreciate, various other types of communication systems which implement variable rate coding and voice activity detection (VAD) may beneficially employ the present invention. One such type of system which implements VAD for prolonging battery life is time division multiple access (TDMA) communications system.

As shown in FIG. 1, a public switched telephone network 103 (PSTN) is coupled to a mobile switching center 106 (MSC). As is well known in the art, the PSTN 103 provides wireline switching capability while the MSC 106 provides switching capability related to the CDMA radiotelephone system. Also coupled to the MSC 106 is a controller 109, the controller 109 including noise suppression, rate determination and voice coding/decoding in accordance with the invention. The controller 109 controls the routing of signals to/from base-stations 112–113 where the base-stations are responsible for communicating with a mobile station 115. The CDMA radiotelephone system is compatible with Interim Standard (IS) 95-A. For more information on IS-95-A, see TIA/EIA/IS-95-A, *Mobile Station-Base Station Compatibility Standard for Dual Mode Wideband Spread Spectrum Cellular System*, July 1993. While the switching capability of the MSC 106 and the control capability of the controller 109 are shown as distributed in FIG. 1, one of ordinary skill in the art will appreciate that the two functions could be combined in a common physical entity for system implementation.

Figure 2:
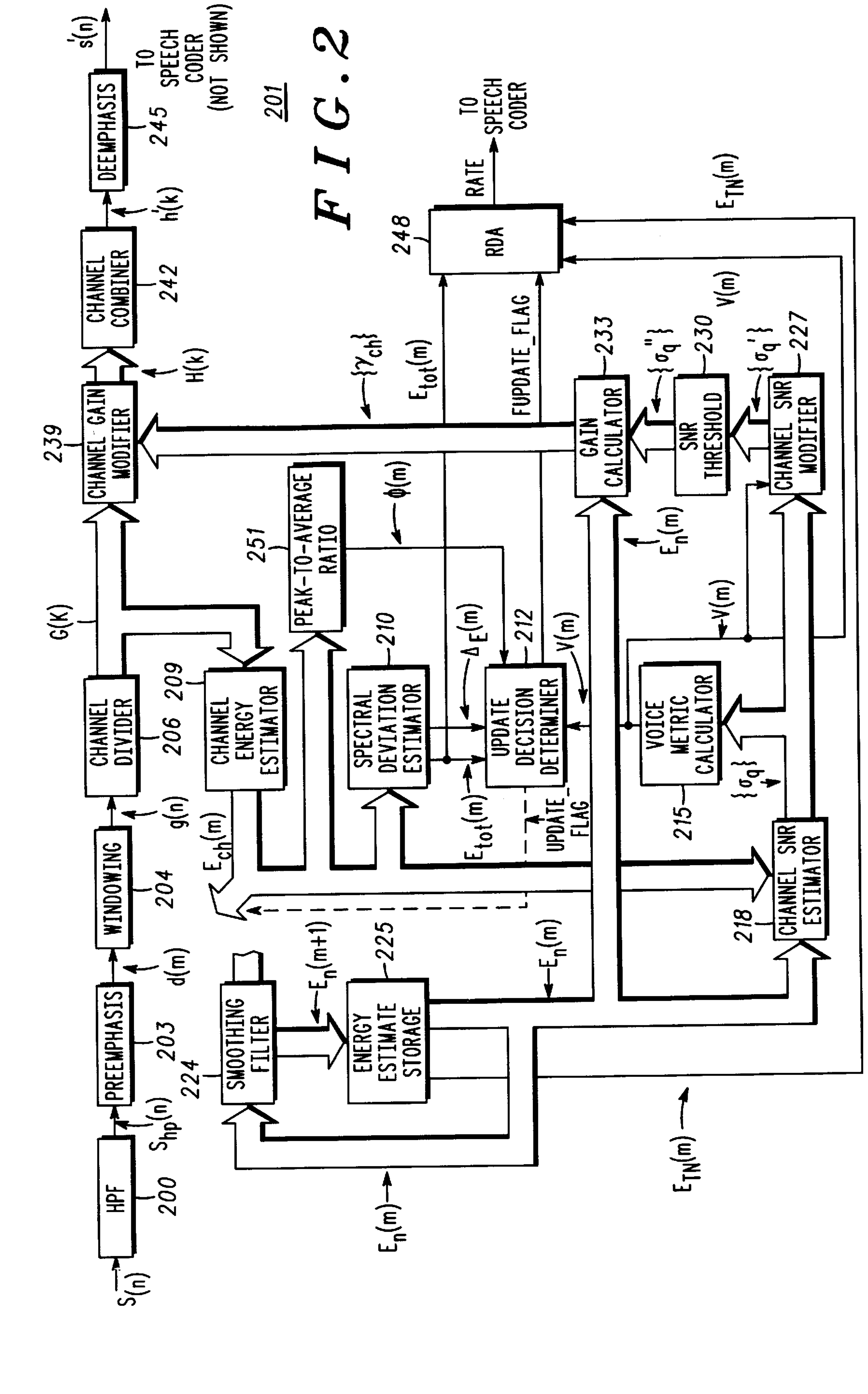
FIG. 2 generally depicts a block diagram of an apparatus useful in implementing rate determination in accordance with the invention.

As shown in FIG. 2, a signal s(n) is input into the controller 109 from the MSC 106 and enters the apparatus 201 which performs noise suppression based rate determination in accordance with the invention. In the preferred embodiment, the noise suppression portion of the apparatus 201 is a slightly modified version of the noise suppression system described in § 4.1.2 of TIA document IS-127 titled *"Enhanced Variable Rate Codec, Speech Service Option* 3 *for Wideband Spread Spectrum Digital Systems"* published January 1997 in the United States, the disclosure of which is herein incorporated by reference. The signal s'(n) exiting the apparatus 201 enters a voice encoder (not shown) which is well known in the art and encodes the noise suppressed signal for transfer to the mobile station 115 via a base station 112–113. Also shown in FIG. 2 is a rate determination algorithm (RDA) 248 which uses parameters from the noise suppression system to determine voice activity and rate determination information in accordance with the invention.

To fully understand how the parameters from the noise suppression system are used to determine voice activity and rate determination information, an understanding of the noise suppression system portion of the apparatus 201 is necessary. It should be noted at this point that the operation of the noise suppression system portion of the apparatus 201 is generic in that it is capable of operating with any type of speech coder a design engineer may wish to implement in a particular communication system. It is noted that several blocks depicted in FIG. 2 of the present application have similar operation as corresponding blocks depicted in FIG. 1 of U.S. Pat. No. 4,811,404 to Vilmur. As such, U.S. Pat. No. 4,811,404 to Vilmur, assigned to the assignee of the present application, is incorporated herein by reference.

Referring now to FIG. 2, the noise suppression portion of the apparatus 201 comprises a high pass filter (HPF) 200 and remaining noise suppressor circuitry. The output of the HPF 200 $s_{hp}(n)$ is used as input to the remaining noise suppressor circuitry. Although the frame size of the speech coder is 20 ms (as defined by IS-95), a frame size to the remaining noise suppressor circuitry is 10 ms. Consequently, in the preferred embodiment, the steps to perform noise suppression are executed two times per 20 ms speech frame.

To begin noise suppression, the input signal s(n) is high pass filtered by high pass filter (HPF) 200 to produce the signal $s_{hp}(n)$. The HPF 200 is a fourth order Chebyshev type II with a cutoff frequency of 120 Hz which is well known in the art. The transfer function of the HPF 200 is defined as:

$$H_{hp}(z) = \frac{\sum_{i=0}^{4} b(i)z^{-i}}{\sum_{i=0}^{4} a(i)z^{-i}},$$

where the respective numerator and denominator coefficients are defined to be:

$$b=\{0.898025036, -3.59010601, 5.38416243, -3.59010601, 0.898024917\},$$

$$a=\{1.0, -3.78284979, 5.37379122, -3.39733505, 0.806448996\}.$$

As one of ordinary skill in the art will appreciate, any number of high pass filter configurations may be employed.

Figure 3:
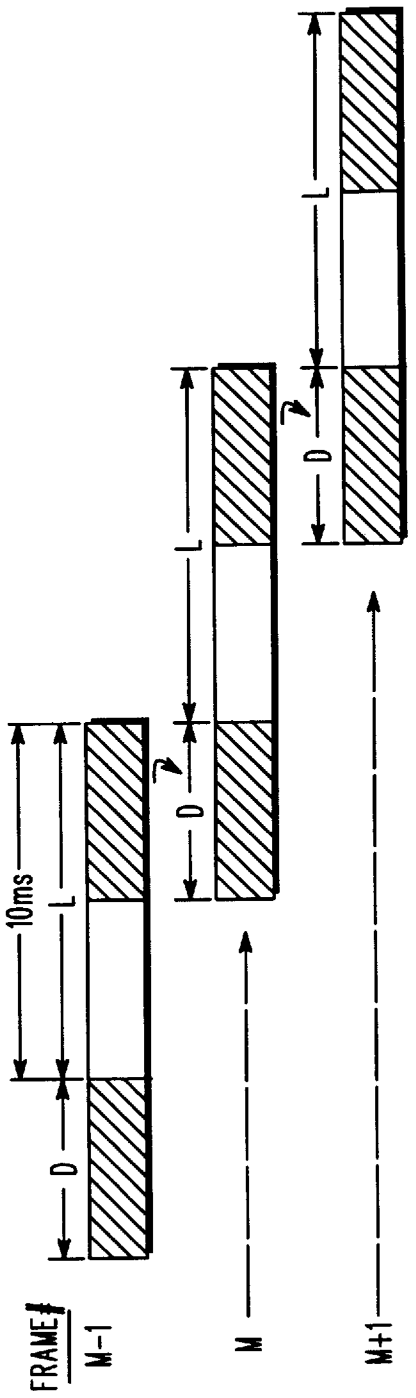
FIG. 3 generally depicts frame-to-frame overlap which occurs in the noise suppression system of FIG. 2.

Next, in the preemphasis block 203, the signal $s_{hp}(n)$ is windowed using a smoothed trapezoid window, in which the first D samples d(m) of the input frame (frame "m") are overlapped from the last D samples of the previous frame (frame "m−1"). This overlap is best seen in FIG. 3. Unless otherwise noted, all variables have initial values of zero, e.g., d(m)=0; m≦0. This can be described as:

$$d(m,n)=d(m-1,L+n); 0 \leq n < D,$$

where m is the current frame, n is a sample index to the buffer {d(m)}, L=80 is the frame length, and D=24 is the overlap (or delay) in samples. The remaining samples of the input buffer are then preemphasized according to the following:

$$d(m,D+n)=s_{hp}(n)+\zeta_p s_{hp}(n-1);0\leq n<L,$$

where $\zeta_p=-0.8$ is the preemphasis factor. This results in the input buffer containing L+D=104 samples in which the first D samples are the preemphasized overlap from the previous frame, and the following L samples are input from the current frame.

Figure 4:
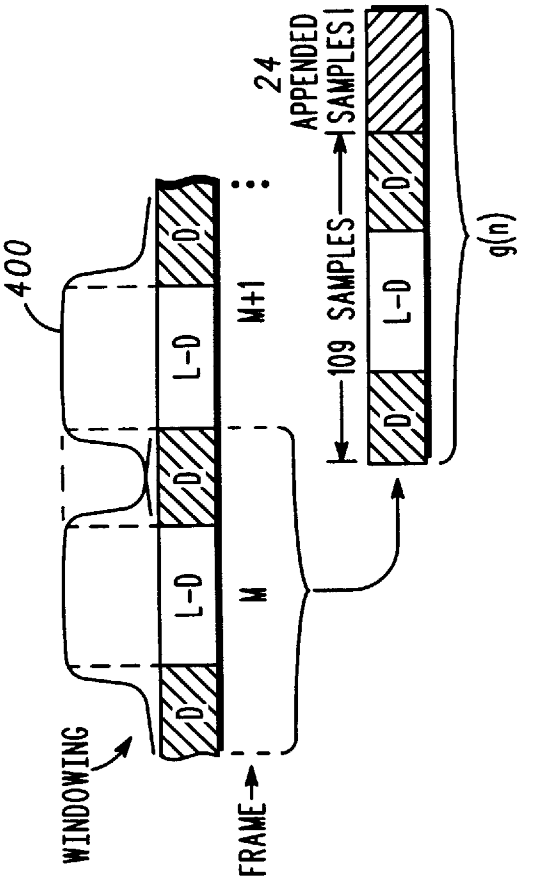
FIG. 4 generally depicts trapezoidal windowing of pre-emphasized samples which occurs in the noise suppression system of FIG. 2.

Next, in the windowing block 204 of FIG. 2, a smoothed trapezoid window 400 (FIG. 4) is applied to the samples to form a Discrete Fourier Transform (DFT) input signal g(n). In the preferred embodiment, g(n) is defined as:

$$g(n)=\begin{cases} d(m,n)\sin^2(\pi(n+0.5)/2D) & ;0\leq n<D, \\ d(m,n) & ;D\leq n<L, \\ d(m,n)\sin^2(\pi(n-L+D+0.5)/2D) & ;L\leq n<D+L, \\ 0 & ;D+L\leq n<M, \end{cases}$$

where M=128 is the DFT sequence length and all other terms are previously defined.

In the channel divider 206 of FIG. 2, the transformation of g(n) to the frequency domain is performed using the Discrete Fourier Transform (DFT) defined as:

$$G(k)=\frac{2}{M}\sum_{n=0}^{M-1} g(n)e^{-j2\pi nk/M};\quad 0\leq k<M,$$

where $e^{j\omega}$ is a unit amplitude complex phasor with instantaneous radial position ω. This is an atypical definition, but one that exploits the efficiencies of the complex Fast Fourier Transform (FFT). The 2/M scale factor results from preconditioning the M point real sequence to form an M/2 point complex sequence that is transformed using an M/2 point complex FFT. In the preferred embodiment, the signal G(k) comprises 65 unique channels. Details on this technique can be found in Proakis and Manolakis, *Introduction to Digital Signal Processing,* 2nd Edition, New York, Macmillan, 1988, pp. 721–722.

The signal G(k) is then input to the channel energy estimator 209 where the channel energy estimate $E_{ch}(m)$ for the current frame, m, is determined using the following:

$$E_{ch}(m,i)=\max\left\{E_{\min},\ \alpha_{ch}(m)E_{ch}(m-1,i)+(1-\alpha_{ch}(m))\frac{1}{f_H(i)-f_L(i)+1}\sum_{k=f_L(i)}^{f_H(i)}|G(k)|^2\right\};\ 0\leq i<N_c,$$

where $E_{min}=0.0625$ is the minimum allowable channel energy, $a_{ch}(m)$ is the channel energy smoothing factor (defined below), $N_c=16$ is the number of combined channels, and $f_L(i)$ and $f_H(i)$ are the $i^{th}$ elements of the respective low and high channel combining tables, $f_L$ and $f_H$. In the preferred embodiment, $f_L$ and $f_H$ are defined as:

$f_L$={2,4,6,8,10,12,14,17,20,23,27,31,36,42,49,56}, $f_H$={3,5,7,9,11,13,16,19,22,26,30,35,41,48,55,63}.

The channel energy smoothing factor, $a_{ch}(m)$, can be defined as:

$$\alpha_{ch}(m)=\begin{cases} 0 & ;m\leq 1, \\ 0.45 & ;m>1. \end{cases}$$

which means that $\alpha_{ch}(m)$ assumes a value of zero for the first frame (m=1) and a value of 0.45 for all subsequent frames. This allows the channel energy estimate to be initialized to the unfiltered channel energy of the first frame. In addition, the channel noise energy estimate (as defined below) should be initialized to the channel energy of the first four frames, i.e.:

$$E_n(m,i)=\max\{E_{init},E_{ch}(m,i)\};1\leq m\leq 4,0\leq i\leq N_c$$

where $E_{init}=16$ is the minimum allowable channel noise initialization energy.

The channel energy estimate $E_{ch}(m)$ for the current frame is next used to estimate the quantized channel signal-to-noise ratio (SNR) indices. This estimate is performed in the channel SNR estimator 218 of FIG. 2, and is determined as:

$$\sigma_q(i)=\max\left\{0,\ \min\left\{89,\ \mathrm{round}\left\{10\log_{10}\left(\frac{E_{ch}(m,i)}{E_n(m,i)}\right)\Big/0.375\right\}\right\}\right\};$$
$$0\leq i<N_c,$$

where $E_n(m)$ is the current channel noise energy estimate (as defined later), and the values of $\{s_q\}$ are constrained to be between 0 and 89, inclusive.

Using the channel SNR estimate $\{s_q\}$, the sum of the voice metrics is determined in the voice metric calculator 215 using:

$$v(m)=\sum_{i=0}^{N_c-1} v(\sigma_q(i))$$

where V(k) is the $k^{th}$ value of the 90 element voice metric table V, which is defined as:

V={2,2,2,2,2,2,2,2,2,2,2,3,3,3,3,3,4,4,4,5,5,5,6,6,7,7,7,8,8,9,9,10, 10, 11,12,12,13,13,14,15,15,16,17,17,18,19,20,20,21,22,23,24, 24,25,26,27,28,28, 29,30,31,32,33,34,35,36,37,37,38,39,40,41, 42,43,44,45,46,47,48,49,50,50,50, 50,50,50,50,50,50,50,50}.

Figure 5:
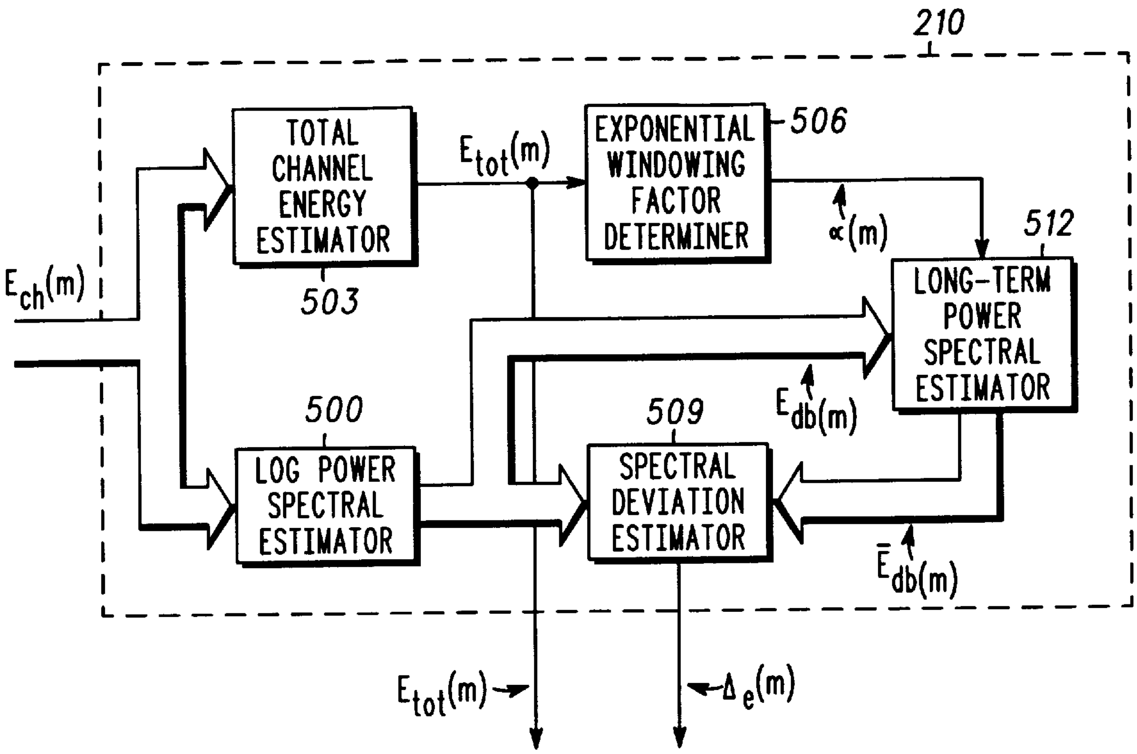
FIG. 5 generally depicts a block diagram of the spectral deviation estimator within the noise suppression system depicted in FIG. 2.

The channel energy estimate $E_{ch}(m)$ for the current frame is also used as input to the spectral deviation estimator 210, which estimates the spectral deviation $\Delta_E(m)$. With reference to FIG. 5, the channel energy estimate $E_{ch}(m)$ is input into a log power spectral estimator 500, where the log power spectra is estimated as:

$$E_{dB}(m,i)=10\log_{10}(E_{ch}(m,i));0\leq i<N_c.$$

The channel energy estimate $E_{ch}(m)$ for the current frame is also input into a total channel energy estimator 503, to determine the total channel energy estimate, $E_{tot}(m)$, for the current frame, m, according to the following:

$$E_{tot}(m)=10\log_{10}\left(\sum_{i=0}^{N_c-1}E_{ch}(m,i)\right).$$

Next, an exponential windowing factor, α(m) (as a function of total channel energy $E_{tot}(m)$) is determined in the exponential windowing factor determiner 506 using:

$$\alpha(m) = \alpha_H - \left(\frac{\alpha_H - \alpha_L}{E_H - E_L}\right)(E_H - E_{tot}(m)),$$

which is limited between $\alpha_H$ and $\alpha_L$ by:

$$\alpha(m)=\max\{\alpha_L, \min\{\alpha_H,\alpha(m)\}\},$$

where $E_H$ and $E_L$ are the energy endpoints (in decibels, or "dB") for the linear interpolation of $E_{tot}(m)$, that is transformed to a (m) which has the limits $\alpha_A \leqq \alpha(m) \leqq \alpha_H$. The values of these constants are defined as: $E_H=50$, $E_L=30$, $\alpha_H=0.99$, $\alpha_L=0.50$. Given this, a signal with relative energy of, say, 40 dB would use an exponential windowing factor of $\alpha(m)=0.745$ using the above calculation.

The spectral deviation $\Delta_E(m)$ is then estimated in the spectral deviation estimator 509. The spectral deviation $\Delta_E(m)$ is the difference between the current power spectrum and an averaged long-term power spectral estimate:

$$\Delta_E(m) = \sum_{i=0}^{N_c-1} |E_{dB}(m, i) - \overline{E}_{dB}(m, i)|,$$

where $\overline{E}_{dB}(m)$ is the averaged long-term power spectral estimate, which is determined in the long-term spectral energy estimator 512 using:

$$\overline{E}_{dB}(m+1,i)=\alpha(m)\overline{E}_{dB}(m,i)+(1-\alpha(m))E_{dB}(m,i);0\leqq i<N_c,$$

where all the variables are previously defined. The initial value of $\overline{E}_{dB}(m)$ is defined to be the estimated log power spectra of frame 1, or:

$$\overline{E}_{dB}(m)=E_{dB}(m);m=1.$$

At this point, the sum of the voice metrics v(m), the total channel energy estimate for the current frame $E_{tot}(m)$ and the spectral deviation $\Delta_E(m)$ are input into the update decision determiner 212 to facilitate noise suppression. The decision logic, shown below in pseudo-code and depicted in flow diagram form in FIG. 6, demonstrates how the noise estimate update decision is ultimately made. The process starts at step 600 and proceeds to step 603, where the update flag (update_flag) is cleared. Then, at step 604, the update logic (VMSUM only) of Vilmur is implemented by checking whether the sum of the voice metrics v(m) is less than an update threshold (UPDATE_THLD). If the sum of the voice metric is less than the update threshold, the update counter (update_cnt) is cleared at step 605, and the update flag is set at step 606. The pseudo-code for steps 603–606 is shown below:

update_flag=FALSE;

if (υ(m)≦UPDATE_THLD) {update_flag=TRUE update_cnt=0}

If the sum of the voice metric is greater than the update threshold at step 604, update of the noise estimate is disabled. Otherwise, at step 607, the total channel energy estimate, $E_{tot}(m)$, for the current frame, m, is compared with the noise floor in dB (NOISE_FLOOR_DB), the spectral deviation $\Delta_E$ (m) is compared with the deviation threshold (DEV_THLD). If the total channel energy estimate is greater than the noise floor and the spectral deviation is less than the deviation threshold, the update counter is incremented at step 608. After the update counter has been incremented, a test is performed at step 609 to determine whether the update counter is greater than or equal to an update counter threshold (UPDATE_CNT_THLD). If the result of the test at step 609 is true, then the forced update flag is set at step 613 and the update flag is set at step 606. The pseudo-code for steps 607–609 and 606 is shown below:

else if (($E_{tot}$(m)>NOISE_FLOOR_DB), ($D_E$(m)<DEV_THLD) {update_cnt=update_cnt+1 if (update_cnt≧UPDATE_CNT_THLD) update_flag=TRUE}

Figure 6:
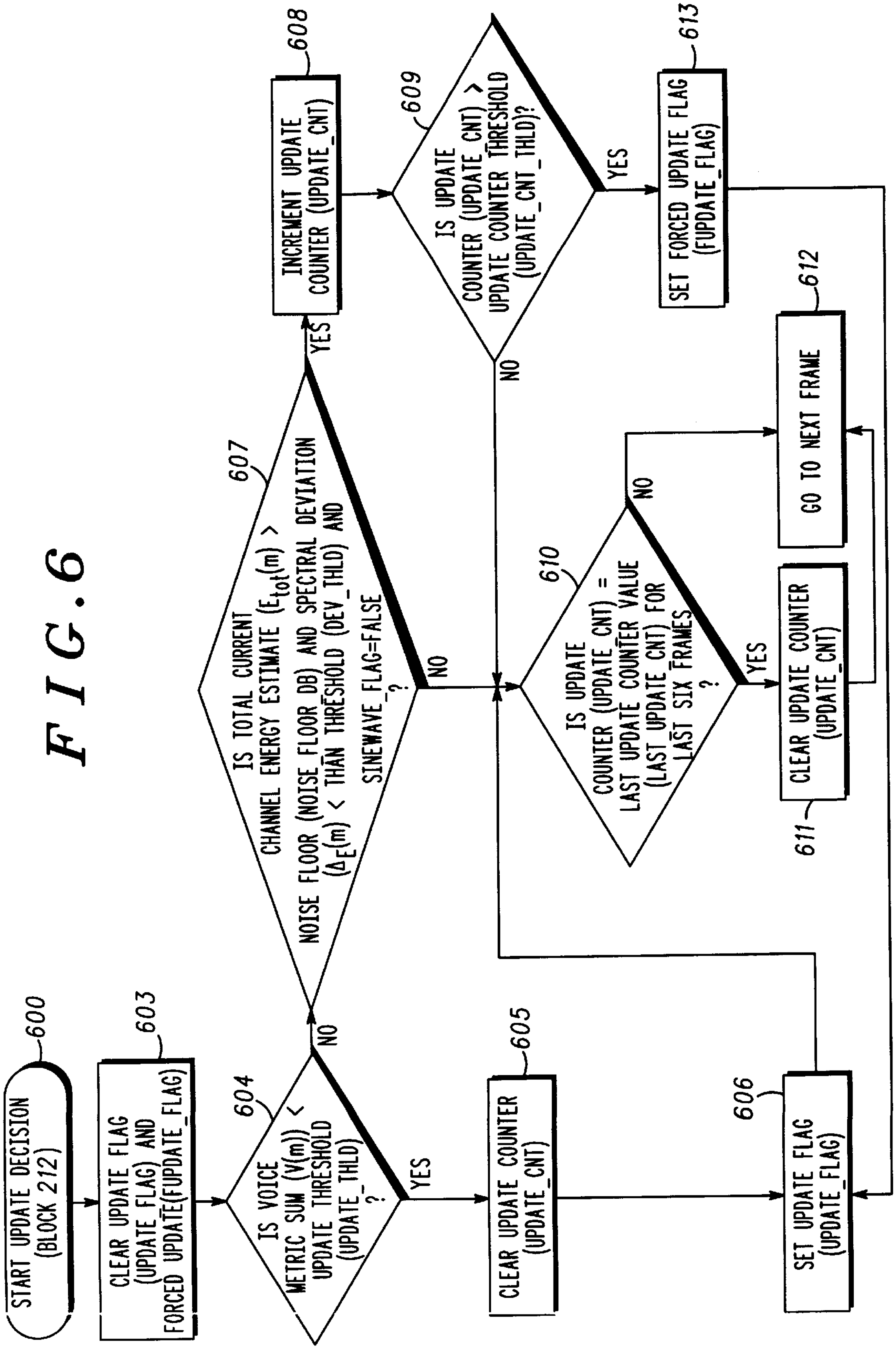
FIG. 6 generally depicts a flow diagram of the steps performed in the update decision determiner within the noise suppression system depicted in FIG. 2.

As can be seen from FIG. 6, if either of the tests at steps 607 and 609 are false, or after the update flag has been set at step 606, logic to prevent long-term "creeping" of the update counter is implemented. This hysteresis logic is implemented to prevent minimal spectral deviations from accumulating over long periods, causing an invalid forced update. The process starts at step 610 where a test is performed to determine whether the update counter has been equal to the last update counter value (last_update_cnt) for the last six frames (HYSTER_CNT_THLD). In the preferred embodiment, six frames are used as a threshold, but any number of frames may be implemented. If the test at step 610 is true, the update counter is cleared at step 611, and the process exits to the next frame at step 612. If the test at step 610 is false, the process exits directly to the next frame at step 612. The pseudo-code for steps 610–612 is shown below:

if (update_cnt==last_update_cnt) hyster_cnt=hyster_cnt+1 else hyster_cnt=0 last_update_cnt=update_cnt if (hyster_cnt>HYSTER_CNT_THLD) update_cnt=0.

In the preferred embodiment, the values of the previously used constants are as follows:

UPDATE_THLD=35,

NOISE_FLOOR_DB=$10\log_{10}(1)$,

DEV_THLD=28,

UPDATE_CNT_THLD=50, and

HYSTER_CNT_THLD=6.

Whenever the update flag at step 606 is set for a given frame, the channel noise estimate for the next frame is updated. The channel noise estimate is updated in the smoothing filter 224 using:

$$E_n(m+1,i)=\max\{E_{min},\alpha_n E_n(m,i)+(1-\alpha_n)E_{ch}(m,i)\};0\leqq i<N_c,$$

where $E_{min}=0.0625$ is the minimum allowable channel energy, and $\alpha_n=0.9$ is the channel noise smoothing factor stored locally in the smoothing filter 224. The updated channel noise estimate is stored in the energy estimate storage 225, and the output of the energy estimate storage 225 is the updated channel noise estimate $E_n(m)$. The updated channel noise estimate $E_n(m)$ is used as an input to the channel SNR estimator 218 as described above, and also the gain calculator 233 as will be described below.

Next, the noise suppression portion of the apparatus 201 determines whether a channel SNR modification should take place. This determination is performed in the channel SNR modifier 227, which counts the number of channels which have channel SNR index values which exceed an index threshold. During the modification process itself, channel SNR modifier 227 reduces the SNR of those particular channels having an SNR index less than a setback threshold (SETBACK_THLD), or reduces the SNR of all of the channels if the sum of the voice metric is less than a metric threshold (METRIC_THLD). A pseudo-code representation of the channel SNR modification process occurring in the channel SNR modifier 227 is provided below:

index_cnt=0 for ($i=N_M$ to $N_c-1$ step 1) {if ($(\sigma_q(i) \geqq$ INDEX_THLD) index_cnt=index_cnt+1} if (index_cnt<INDEX_CNT_THLD) modify_flag=TRUE else modify_flag=FALSE if (modify_flag==TRUE) for ($i=0$ to $N_c-1$ step 1) if ((v(m)≦METRIC_THLD) or ($\sigma_q(i) \leqq$ SETBACK_THLD))

$$\sigma'_q(i)=1$$

else $$\sigma'_q(i)=\sigma_q(i)$$

else $$\{\sigma'_q\}=\{\sigma_q\}$$

At this point, the channel SNR indices $\{\sigma_q'\}$ are limited to a SNR threshold in the SNR threshold block 230. The constant $\sigma_{th}$ is stored locally in the SNR threshold block 230. A pseudo-code representation of the process performed in the SNR threshold block 230 is provided below:

for ($i=0$ to $N_c-1$ step 1) if ($\sigma'_q(i)<\sigma_{th}$)

$$\sigma''_q(i)=\sigma_{th}$$

else $$\sigma''_q(i)=\sigma'_q(i)$$

In the preferred embodiment, the previous constants and thresholds are given to be:

$N_M=5$,

INDEX_THLD=12,

INDEX_CNT_THLD=5,

METRIC_THLD=45,

SETBACK_THLD=12, and $\sigma_{th}=6$.

At this point, the limited SNR indices $\{\sigma_q''\}$ are input into the gain calculator 233, where the channel gains are determined. First, the overall gain factor is determined using:

$$\gamma_n = \max\left\{\gamma_{\min}, -10\log_{10}\left(\frac{1}{E_{floor}}\sum_{i=0}^{N_c-1} E_n(m,i)\right)\right\},$$

where $\gamma_{min}=-13$ is the minimum overall gain, $E_{floor}=1$ is the noise floor energy, and $E_n(m)$ is the estimated noise spectrum calculated during the previous frame. In the preferred embodiment, the constants $\gamma_{min}$ and $E_{floor}$ are stored locally in the gain calculator 233. Continuing, channel gains (in dB) are then determined using:

$$\gamma_{dB}(i)=\mu_g(\sigma''_q(i)-\sigma_{th})+\gamma_n; 0 \leqq i < N_c,$$

where $\mu_g=0.39$ is the gain slope (also stored locally in gain calculator 233). The linear channel gains are then converted using:

$$\gamma_{ch}(i)=\min\{1, 10^{\gamma_{dB}(i)/20}\}; 0 \leqq i < N_c.$$

At this point, the channel gains determined above are applied to the transformed input signal G(k) with the following criteria to produce the output signal H(k) from the channel gain modifier 239:

$$H(k) = \begin{cases} \gamma_{ch}(i)G(k) & ; f_L(i) \le k \le f_H(i), 0 \le i < N_c, \\ G(k) & ; \text{otherwise.} \end{cases}$$

The otherwise condition in the above equation assumes the interval of k to be $0 \leqq k \leqq M/2$. It is further assumed that the magnitude of H(k) is even symmetric, so that the following condition is also imposed:

$$H(M-k)=H^*(k); 0<k<M/2$$

where the * denotes a complex conjugate. The signal H(k) is then converted (back) to the time domain in the channel combiner 242 by using the inverse DFT:

$$h(m,n) = \frac{1}{2}\sum_{k=0}^{M-1} H(k)e^{j2\pi nk/M}; \quad 0 \le n < M,$$

and the frequency domain filtering process is completed to produce the output signal h'(n) by applying overlap-and-add with the following criteria:

$$h'(n) = \begin{cases} h(m,n) + h(m-1, n+L) & ; 0 \le n < M-L, \\ h(m,n) & ; M-L \le n < L, \end{cases}$$

Signal deemphasis is applied to the signal h'(n) by the deemphasis block 245 to produce the signal s'(n) having been noised suppressed:

$$s'(n)=h'(n)+\zeta_d s'(n-1); 0 \leqq n < L,$$

where $\zeta_d=0.8$ is a deemphasis factor stored locally within the deemphasis block 245.

As stated above, the noise suppression portion of the apparatus 201 is a slightly modified version of the noise suppression system described in § 4.1.2 of TIA document IS-127 titled *"Enhanced Variable Rate Codec, Speech Service Option* 3 *for Wideband Spread Spectrum Digital Systems"*. Specifically, a rate determination algorithm (RDA) block 248 is additionally shown in FIG. 2 as is a peak-to-average ratio block 251. The addition of the peak-to-average ratio block 251 prevents the noise estimate from being updated during "tonal" signals. This allows the transmission of sinewaves at Rate 1 which is especially useful for purposes of system testing.

Still referring to FIG. 2, parameters generated by the noise suppression system described in IS-127 are used as the basis for detecting voice activity and for determining transmission rate in accordance with the invention. In the preferred embodiment, parameters generated by the noise suppression system which are implemented in the RDA block 248 in accordance with the invention are the voice metric sum v(m), the total channel energy $E_{tot}(m)$, the total estimated noise energy $E_{tn}(m)$, and the frame number m. Additionally, a new flag labeled the "forced update flag" (fupdate_flag) is generated to indicate to the RDA block 248 when a forced update has occurred. A forced update is a mechanism which allows the noise suppression portion to recover when a sudden increase in background noise causes the noise suppression system to erroneously misclassify the background noise. Given these parameters as inputs to the RDA block 248 and the "rate" as the output of the RDA block 248, rate determination in accordance with the invention can be explained in detail.

As stated above, most of the parameters input into the RDA block 248 are generated by the noise suppression system defined in IS-127. For example, the voice metric sum υ(m) is determined in Eq. 4.1.2.4-1 while the total channel energy $E_{tot}(m)$ is determined in Eq. 4.1.2.5-4 of IS-127. The total estimated noise energy $E_{tn}(m)$ is given by:

$$E_{tn}(m) = 10\log_{10}\left(\sum_{i=0}^{N_c-1} E_n(m,i)\right)$$

which is readily available from Eq. 4.1.2.8-1 of IS-127. The 10 millisecond frame number, m, starts at m=1. The forced update flag, fupdate_flag, is derived from the "forced update" logic implementation shown in §4.1.2.6 of IS-127. Specifically, the pseudo-code for the generation of the forced update flag, fupdate_flag, is provided below:

/* Normal update logic */ update_flag=fupdate_flag= FALSE if (v(m)≦UPDATE_THLD) {update_flag= TRUE update_cnt=0}

/* Forced update logic */ else if (($E_{tot}$(m)>NOISE_FLOOR_DB) and ($\Delta_E$(m)<DEV_THLD) and (sinewave_flag==FALSE)) {update_cnt=update_cnt+1 if (update_cnt≧UPDATE_CNT_THLD) update_flag=fupdate_flag=TRUE}

Here, the sinewave_flag is set TRUE when the spectral peak-to-average ratio ϕ(m) is greater than 10 dB and the spectral deviation $\Delta_E(m)$ (Eq. 4.2.1.5-2) is less than DEV_THLD. Stated differently:

$$\text{sinewave\_flag} = \begin{cases} TRUE; & \Delta_E(m) < DEV\_THLD \text{ and } \phi(m) > 10 \\ FALSE; & \text{otherwise} \end{cases}$$

where:

$$\phi(m) = 10\log_{10}\left(\frac{\max\{E_{ch}(m)\}}{\sum_{i=0}^{N_c-1} E_{ch}(m,i)/N_c}\right)$$

is the peak-to-average ratio determined in the peak-to-average ratio block 251 and $E_{ch}(m)$ is the channel energy estimate vector given in Eq. 4.1.2.2-1 of IS-127.

Once the appropriate inputs have been generated, rate determination within the RDA block 248 can be performed in accordance with the invention. With reference to the flow diagram depicted in FIG. 7, the modified total energy $E'_{tot}(m)$ is given as:

$$E'_{tot}(m) = \begin{cases} 56\text{ dB}; & m \le 4 \text{ or update\_flag} = \text{TRUE} \\ E_{tot}(m); & \text{otherwise} \end{cases}$$

Here, the initial modified total energy is set to an empirical 56 dB. The estimated total SNR can then be calculated, at step 703, as:

$$SNR = E'_{tot}(m) - E_{tn}(m)$$

This result is then used, at step 706, to estimate the long-term peak SNR, $SNR_p(m)$, as:

$$SNR_p(m) = \begin{cases} SNR; & SNR > SNR_p(m-1) \text{ or update\_flag} = \text{TRUE} \\ 0.998SNR_p(m-1) + 0.002SNR; & SNR > 0.375SNR_p(m-1) \\ SNR_p(m-1); & \text{otherwise} \end{cases}$$

where $SNR_p(0)=0$. The long-term peak SNR is then quantized, at step 709, in 3 dB steps and limited to be between 0 and 19, as follows:

$$SNR_Q = \max\{\min\{\lfloor SNR_p(m)/3 \rfloor, 19\}, 0\}$$

where ⌊x⌋ is the largest integer≦x (floor function). The quantized SNR can now be used to determine, at step 712, the respective voice metric threshold $v_{th}$, hangover count $h_{cnt}$, and burst count threshold $b_{th}$ parameters:

$$v_{th} = v_{table}[SNR_Q],\ h_{cnt} = h_{table}[SNR_Q],\ b_{th} = b_{table}[SNR_Q]$$

where $SNR_Q$ is the index of the respective tables which are defined as:

$v_{table}$={37,37,37,37,37,37,38,38,43,50,61,75,94,118,146,178,216, 258,306,359}

$h_{table}$={25,25,25,20,16,13,10,8,6,5,4,3,2,1,0,0,0,0,0,0}

$b_{table}$={8,8,8,8,8,8,8,8,8,8,8,7,6,5,4,3,2,1,1,1}

With this information, the rate determination output from the RDA block 248 is made. The respective voice metric threshold $v_{th}$hangover count $h_{cnt}$, and burst count threshold $b_{th}$ parameters output from block 712 are input into block 715 where a test is performed to determine whether the voice metric, v(m), is greater than the voice metric threshold. The voice metric threshold is determined using Eq. 4.1.2.4-1 of IS-127. Important to note is that the voice metric, v(m), output from the noise suppression system does not change but it is the voice metric threshold which varies within the RDA 248 in accordance with the invention.

Figure 7:
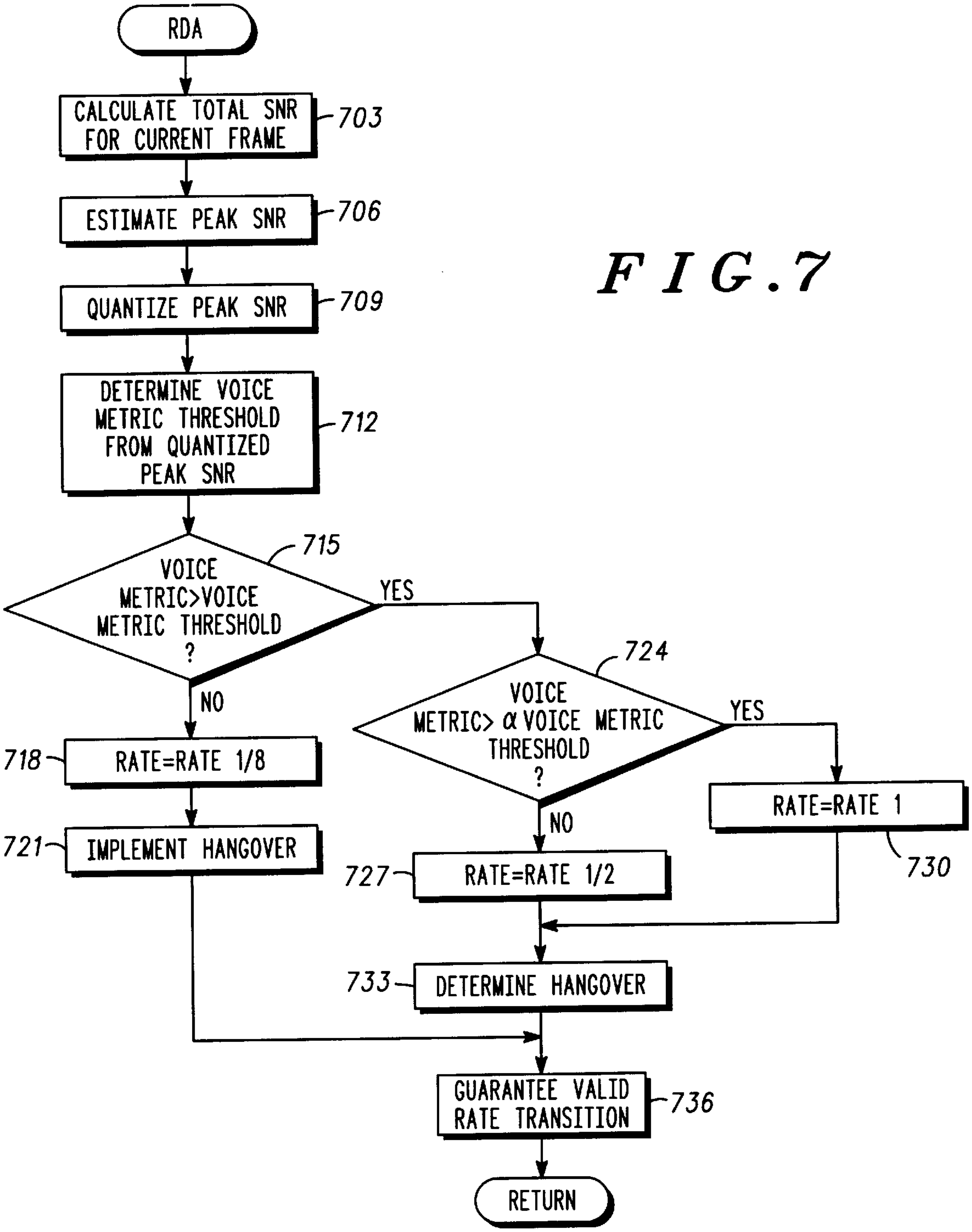
FIG. 7 generally depicts a flow diagram of the steps performed by the rate determination block of FIG. 2 to determine transmission rate in accordance with the invention.

Referring to step 715 of FIG. 7, if the voice metric, v(m), is less than the voice metric threshold, then at step 718 the rate in which to transmit the signal s'(n) is determined to be 1/8 rate. After this determination, a hangover is implemented at step 721. The hangover is commonly implemented to "cover" slowly decaying speech that might otherwise be classified as noise, or to bridge small gaps in speech that may be degraded by aggressive voice activity detection. After the hangover is implemented at step 721, a valid rate transmission is guaranteed at step 736. At this point, the signal s'(n) is coded at 1/8 rate and transmitted to the appropriate mobile station 115 in accordance with the invention.

If, at step 715, the voice metric, v(m), is greater than the voice metric threshold, then another test is performed at step 724 to determine if the voice metric, v(m), is greater than a weighted (by an amount α) voice metric threshold. This process allows speech signals that are close to the noise floor to be coded at Rate 1/2 which has the advantage of lowering the average data rate while maintaining high voice quality. If the voice metric, v(m), is not greater than the weighted voice metric threshold at step 724, the process flows to step 727 where the rate in which to transmit the signal s'(n) is determined to be 1/2 rate. If, however, the voice metric, v(m), is greater than the weighted voice metric threshold at step 724, then the process flows to step 730 where the rate in which to transmit the signal s'(n) is determined to be rate 1 (otherwise known as full rate). In either event (transmission at 1/2 rate via step 727 or transmission at full rate via step 730), the process flows to step 733 where a hangover is determined. After the hangover is determined, the process flows to step 736 where a valid rate transmission is guaranteed. At this point, the signal s'(n) is coded at either 1/2 rate or full rate and transmitted to the appropriate mobile station 115 in accordance with the invention.

Steps 715 through 733 of FIG. 7 can also be explained with reference to the following pseudocode:

if $(v(m)>v_{th})$ {if $(v(m)>\alpha v_{th})$ {/* $\alpha$=1.1*/ rate(m)= RATE1} else

{rate(m)=RATE1/2} b(m)=b(m−1)+1 /* increment burst counter */ if $(b(m)>b_{th})$ {/* compare counter with threshold */ h(m)=$h_{cnt}$ /* set hangover */}} else

{b(m)=0 /* clear burst counter */ h(m)=h(m−1)−1 /* decrement hangover */ if (h(m)≧0) {rate(m)=RATE1/8 h(m)=0} else

{rate(m)=rate(m−1)}}

The following psuedo code prevents invalid rate transitions as defined in IS-127. Note that two 10 ms noise suppression frames are required to determine one 20 ms vocoder frame rate. The final rate is determined by the maximum of two noise suppression based RDA frames.

if (rate(m)==RATE1/8 and rate(m−2)==RATE1){rate(m)= RATE1/2}

While the invention has been particularly shown and described with reference to a particular embodiment, it will be understood by those skilled in the art that various changes in form and details may be made therein without departing from the spirit and scope of the invention. For example, the apparatus useful in implementing rate determination in accordance with the invention is shown in FIG. 2 as being implemented in the infrastructure side of the communication system, but one of ordinary skill in the art will appreciate that the apparatus of FIG. 2 could likewise be implemented in the mobile station 115. In this implementation, no changes are required to FIG. 2 to implement rate determination in accordance with the invention.

Figure 8:
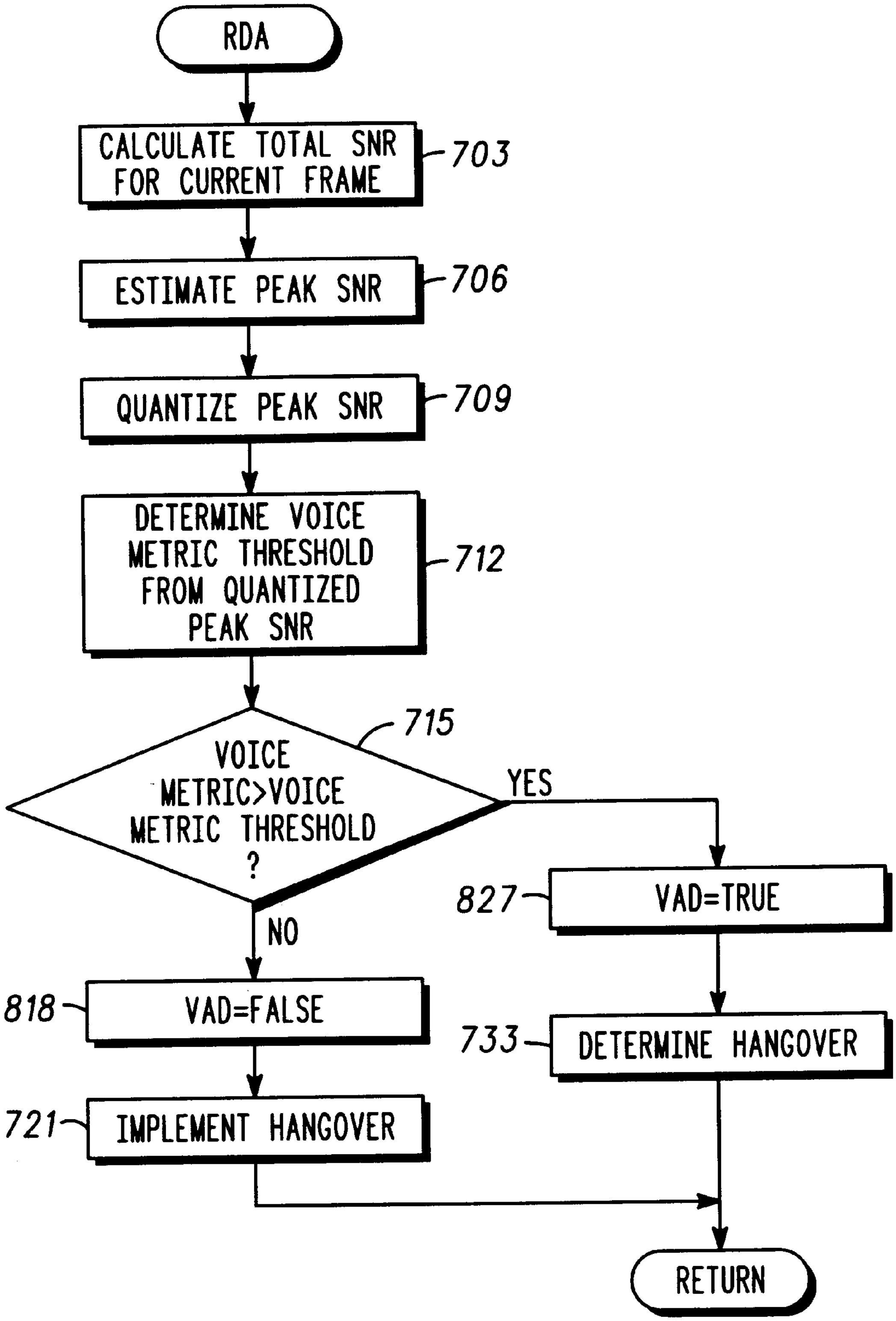
FIG. 8 generally depicts a flow diagram of the steps performed by a voice activity detector to determine the presence of voice activity in accordance with the invention.

Also, the concept of rate determination in accordance with the invention as described with specific reference to a CDMA communication system can be extended to voice activity detection (VAD) as applied to a time-division multiple access (TDMA) communication system in accordance with the invention. In this implementation, the functionality of the RDA block 248 of FIG. 2 is replaced with the functionality of voice activity detection (VAD) where the output of the VAD block 248 is a VAD decision which is likewise input into the speech coder. The steps performed to determine whether voice activity exiting the VAD block 248 is TRUE or FALSE is similar to the flow diagram of FIG. 7 and is shown in FIG. 8. As shown in FIG. 8, the steps 703–715 are the same as shown in FIG. 7. However, if the test at step 715 is false, then VAD is determined to be FALSE at step 818 and the flow proceeds to step 721 where a hangover is implemented. If the test at step 715 is true, then VAD is determined to be TRUE at step 827 and the flow proceeds to step 733 where a hangover is determined.

The corresponding structures, materials, acts and equivalents of all means or step plus function elements in the claims below are intended to include any structure, material, or acts for performing the functions in combination with other claimed elements as specifically claimed.

What I claim is:

1. A method of determining a transmission rate for a frame of information in a communication system, the method comprising the steps of:

determining a voice metric from the frame of information;

determining a first voice metric threshold from a peak signal-to-noise ratio of a current frame of information and a plurality of past frames of information;

comparing the voice metric to the first voice metric threshold;

transmitting the frame of information at a first rate when the voice metric is less than the first voice metric threshold;

comparing the voice metric to a second voice metric threshold when the voice metric is greater than the first voice metric threshold;

transmitting the frame of information at a second rate when the voice metric is less than the second voice metric threshold; and transmitting the frame of information at a third rate when the voice metric is greater than the second voice metric threshold.

2. The method of claim 1, wherein the communication system further comprises a code-division multiple access (CDMA) communication system as defined in IS-95.

3. The method of claim 2, wherein the first rate comprises 1/8 rate, the second rate comprises 1/2 rate and the third rate comprises full rate of the CDMA communication system.

4. The method of claim 1, wherein the second voice metric threshold is a scaled version of the first voice metric threshold.

5. The method of claim 1, wherein a hangover is implemented or determined after the first, second or third rate has been determined.

6. The method of claim 1, wherein the peak signal-to-noise ratio further comprises a quantized peak signal-to-noise ratio of a current frame of information and a plurality of past frames of information.

7. The method of claim 6, wherein the step of determining a voice metric threshold from the quantized peak signal-to-noise ratio of a current frame of information further comprises:

calculating a total signal-to-noise ratio for the current frame of information;

estimating a peak signal-to-noise ratio based on the calculated total signal-to-noise ratio for the current frame of information and a plurality of past frames of information;

quantizing the peak signal-to-noise ratio of the current frame of information to determine the voice metric threshold.

8. The method of claim 1, wherein the communication system further comprises a time-division multiple access (TDMA) communication system.

9. The method of claim 8, wherein the first rate comprises a silence descriptor (SID) frame and the second and third rates comprise normal rate frames.

10. A method of determining voice activity for a frame of information in a communication system, the method comprising the steps of:

determining a voice metric from the frame of information;

determining a voice metric threshold from a peak signal-to-noise ratio of a current frame of information and a plurality of past frames of information;

comparing the voice metric to the voice metric threshold;

transmitting the frame of information at a first rate when the voice metric is less than the voice metric threshold; and transmitting the frame of information at a second rate when the voice metric is greater than the voice metric threshold.

11. The method of claim 10, wherein the communication system further comprises a time-division multiple access (TDMA) communication system.

12. The method of claim 10, wherein a hangover is implemented or determined after the rate has been determined.

13. The method of claim 10, wherein the peak signal-to-noise ratio further comprises a quantized peak signal-to-noise ratio of a current frame of information and a plurality of past frames of information.

14. The method of claim 13, wherein the step of determining the voice metric threshold further comprises:

calculating a total signal-to-noise ratio for the current frame of information;

estimating a peak signal-to-noise ratio based on the calculated total signal-to-noise ratio for the current frame of information and a plurality of past frames of information; and quantizing the peak signal-to-noise ratio of the current frame of information to determine the voice metric threshold.

15. A system for determining a transmission rate for a frame of information in a communication system, the system comprising:

a rate determination algorithm for determining a voice metric from the frame of information, and for determining a first voice metric threshold from a peak signal-to-noise ratio of a current frame of information and a plurality of past frames of information, and for comparing the voice metric to the first voice metric threshold, and for comparing the voice metric to a second voice metric threshold when the voice metric is greater than the first voice metric threshold;

a speech coder for transmitting the frame of information at a first rate when the voice metric is less than the first voice metric threshold, and for transmitting the frame of information at a second rate when the voice metric is less than the second voice metric threshold, and for transmitting the frame of information at a third rate when the voice metric is greater than the second voice metric threshold.

16. The system of claim 15, wherein the communication system further comprises a code-division multiple access (CDMA) communication system as defined in IS-95.

17. The system of claim 16, wherein the first rate comprises 1/8 rate, the second rate comprises 1/2 rate and the third rate comprises fill rate of the CDMA communication system.

18. The system of claim 15, wherein the second voice metric threshold is a scaled version of the first voice metric threshold.

19. The system of claim 15, wherein a hangover is implemented or determined after the first, second or third rate has been determined.

20. The system of claim 15, wherein the peak signal-to-noise ratio of a current frame of information further comprises a quantized peak signal-to-noise ratio of a current frame of information.

21. The system of claim 20, wherein the rate determination algorithm for determining a voice metric threshold from the quantized peak signal-to-noise ratio of a current frame of information further includes a rate determination algorithm for calculating a total signal-to-noise ratio for the current frame of information, for estimating a peak signal-to-noise ratio based on the calculated total signal-to-noise ratio for the current frame of information and a plurality of past frames of information and for quantizing the peak signal-to-noise ratio of the current frame of information to determine the voice metric threshold.

22. The system of claim 15, wherein the communication system further comprises a time-division multiple access (TDMA) communication system.

23. The system of claim 20, wherein the first rate comprises a silence descriptor (SID) frame and the second and third rates comprise normal rate frames.

24. A system for determining voice activity for a frame of information in a communication system, the system comprising:

a rate determination algorithm for determining a voice metric from the frame of information, and for determining a voice metric threshold from a peak signal-to-noise ratio of a current frame of information and a plurality of past frames of information, and for comparing the voice metric to the voice metric threshold; and a speech coder transmitting the frame of information at a first rate when the voice metric is less than the voice metric threshold and transmitting the frame of information at a second rate when the voice metric is greater than the voice metric threshold.

25. The system of claim 24, wherein the communication system further comprises a time-division multiple access (TDMA) communication system.

26. The system of claim 24, wherein a hangover is implemented or determined after the rate has been determined.

27. The system of claim 24, wherein the peak signal-to-noise ratio of a current frame of information further comprises a quantized peak signal-to-noise ratio of a current frame of information.

28. The system of claim 27, wherein the rate determination algorithm for determining a voice metric threshold from the quantized peak signal-to-noise ratio of a current frame of information further includes a rate determination algorithm for calculating a total signal-to-noise ratio for the current frame of information, estimating a peak signal-to-noise ratio based on the calculated total signal-to-noise ratio for the current frame of information and a plurality of past frames of information and quantizing the peak signal-to-noise ratio of the current frame of information to determine the voice metric threshold.

* * * * *